United States Patent
Park et al.

(10) Patent No.: US 9,386,512 B2
(45) Date of Patent: Jul. 5, 2016

(54) TECHNIQUES FOR ENERGY EFFICIENT WIFI NEIGHBOR AWARENESS NETWORK OPERATION

(71) Applicant: Intel Corporation, Santa Clara, CA (US)

(72) Inventors: Minyoung Park, Portland, OR (US); Emily H. Qi, Portland, OR (US); Venkatakrishna Yellepeddy, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 100 days.

(21) Appl. No.: 14/494,160

(22) Filed: Sep. 23, 2014

(65) Prior Publication Data
US 2015/0319675 A1   Nov. 5, 2015

Related U.S. Application Data

(60) Provisional application No. 61/987,613, filed on May 2, 2014.

(51) Int. Cl.
 H04W 4/00 (2009.01)
 H04W 48/16 (2009.01)
(52) U.S. Cl.
 CPC .................................. H04W 48/16 (2013.01)
(58) Field of Classification Search
 None
 See application file for complete search history.

(56) References Cited

U.S. PATENT DOCUMENTS

| | | | | |
|---|---|---|---|---|
| 2006/0146821 A1* | 7/2006 | Singh | ...................... | H04L 12/18 370/390 |
| 2014/0254569 A1* | 9/2014 | Abraham | .............. | H04L 5/0092 370/336 |
| 2015/0081840 A1* | 3/2015 | Patil | ........................ | H04L 67/28 709/217 |
| 2015/0098388 A1* | 4/2015 | Fang | ..................... | H04W 48/18 370/328 |
| 2015/0200811 A1* | 7/2015 | Kasslin | ................... | H04L 41/12 370/254 |

FOREIGN PATENT DOCUMENTS

WO   WO 2013/174428   * 11/2013

* cited by examiner

*Primary Examiner* — Frank Duong

(57) ABSTRACT

Various embodiments are generally directed to an apparatus, method and other techniques for performing neighbor awareness network (NAN) discovery operations to discover a NAN cluster comprising one or more devices synchronized to a discovery window. In some embodiments, the NAN discovery operation may include communicating a cluster discovery message to join the NAN cluster, waiting a first time period for a response to the cluster discovery message, and joining the NAN cluster based on information in the response to synchronize to the discovery window when the response is received within the first time period. Various embodiments may also include disabling, by the processing circuitry, one or more operations to perform the NAN discovery operations if the response is not received within the first time period.

26 Claims, 13 Drawing Sheets

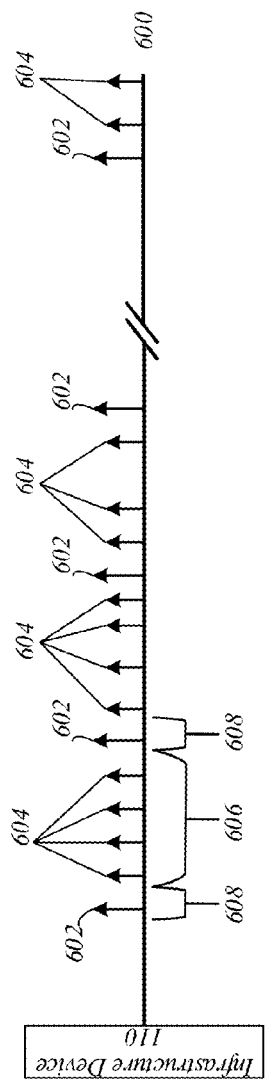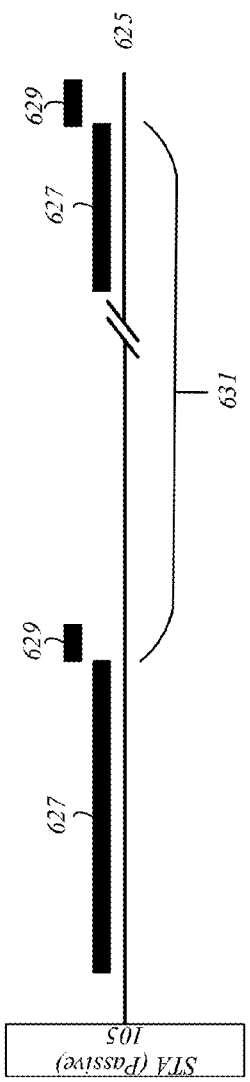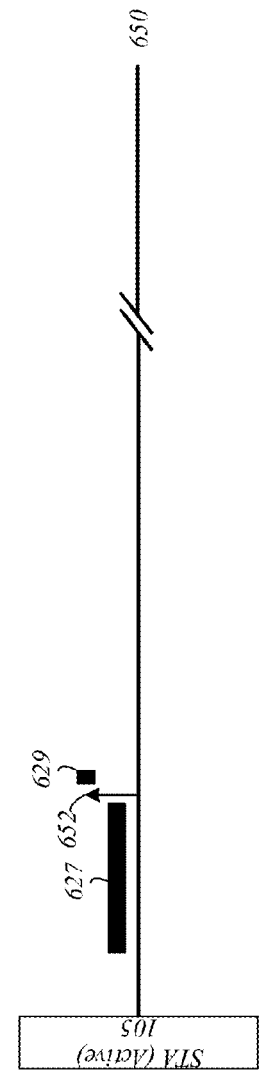

800

- PERFORMING A NEIGHBOR AWARENESS NETWORK (NAN) DISCOVERY OPERATION TO DISCOVER A NAN CLUSTER COMPRISING ONE OR MORE DEVICES SYNCHRONIZED TO A DISCOVERY WINDOW
805

- COMMUNICATING A CLUSTER DISCOVERY MESSAGE TO JOIN THE NAN CLUSTER
810

- DETERMINING WHETHER A RESPONSE TO THE CLUSTER DISCOVERY MESSAGE IS RECEIVED WITHIN A FIRST TIME PERIOD
815

- JOINING THE NAN CLUSTER BASED ON INFORMATION IN THE RESPONSE TO SYNCHRONIZE TO THE DISCOVERY WINDOW WHEN THE RESPONSE IS RECEIVED WITHIN THE FIRST TIME PERIOD
820

- DISABLING ONE OR MORE OPERATIONS TO PERFORM THE NAN DISCOVERY OPERATION WHEN THE RESPONSE IS NOT RECEIVED WITHIN THE FIRST TIME PERIOD
825

*FIG. 8A*

TECHNIQUES FOR ENERGY EFFICIENT WIFI NEIGHBOR AWARENESS NETWORK OPERATION

CLAIM OF PRIORITY

This application claims the benefit of U.S. Provisional Application No. 61/987,613, filed May 2, 2014.

TECHNICAL FIELD

Embodiments described herein generally relate to techniques for processing information in a neighbor awareness network (NAN). More specifically, techniques may include performing active NAN cluster discovery.

BACKGROUND

Recently, there has been an upsurge in the use of residential Institute of Electrical and Electronics Engineers (IEEE) 802.11 wireless networks to provide a distribution medium between homes in a neighborhood. This wireless connectivity may be provided over so-called social channels, defined by the Wi-Fi Alliance®. One such social channel is a neighbor awareness network (NAN) which is an offshoot of Wi-Fi hotspots and wireless local area networks (WLAN). In some instances, a NAN enables users to connect to the Internet quickly and at very little expense. The Wi-Fi Alliance® is developing Wi-Fi NAN specifications that enables device/service discovery based on Wi-Fi.

BRIEF DESCRIPTION OF THE DRAWINGS

FIGS. 6A/6B/6C illustrate exemplary embodiments of time diagrams.

DETAILED DESCRIPTION

Figure 1A:
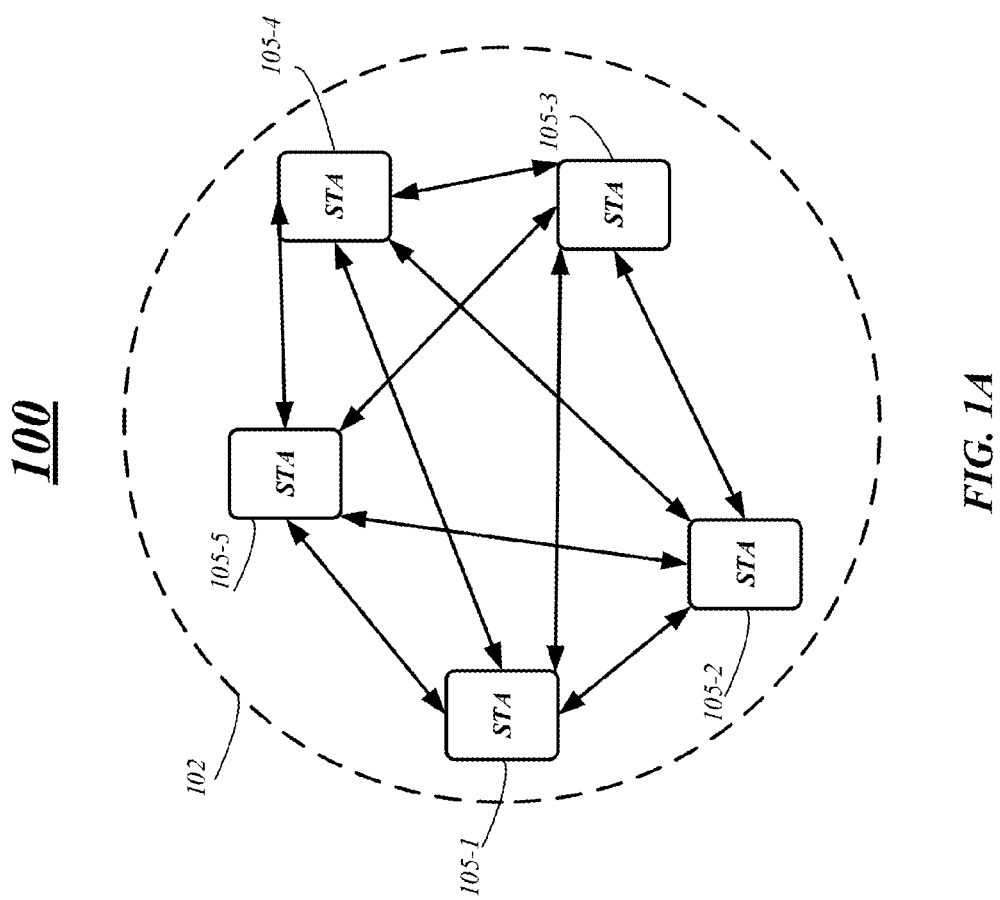
FIG. 1A illustrates an exemplary embodiment of a communication system.

Various embodiments are generally directed to an apparatus, system and method for energy efficient Wi-Fi neighbor awareness network (NAN) operation. Some embodiments may be directed to operations in accordance with one or more standards, such as the Institute of Electrical and Electronics Engineers (IEEE) 802.11-2012, published on Mar. 29, 2012 or according to any predecessors, revisions, or variants thereof including IEEE 802.11aq. Additionally, embodiments may operate in accordance with the Wi-Fi Alliance® Technical Task Group Wi-Fi Neighbor Awareness Networking (NAN) Wi-Fi NAN Technical Specification Version 0.0, revision 18, or according to any predecessors, revisions, or variants thereof.

Some embodiment may be directed to passively and actively searching for NAN networks and NAN clusters to join. As will be explained in more detail, a NAN network may include a number of NAN clusters which are made up of devices such as one more stations (STAs) and infrastructure devices temporally synchronized.

During a passive NAN cluster discovery scheme, one or more devices in the NAN cluster may communicate information including a synchronization beacons and discovery beacons that may be used by a receiving device to join the NAN cluster or NAN network. For example, during a particular time period or discovery window the one or more devices in the NAN cluster may communicate one synchronization beacon. Further, the one or more devices may communicate a number of discovery beacons during a discovery window interval, the period of time between two consecutive discovery windows. The synchronization and discovery beacons may include information such as a NAN identification and a time offset that may be used to synchronize an internal clock such that the receiving is temporally synchronized with the other devices in the NAN cluster or NAN network.

However, this passive approach may use processing cycles and battery power while a receiving device is waiting for one of the synchronization beacons or discovery beacons. Thus, various embodiments may be directed to an active NAN cluster discovery scheme where a device wanting to join a NAN network or NAN cluster may communicate a request, such as cluster discovery message to search for a network or cluster to join. The requesting device may wait for a time period for a response to the request from one or more devices in a NAN network or NAN cluster the device wants to join. As will be discussed in more detail below, the amount of time waiting for a response is typically shorter than the amount of time a device waits for a beacon during a passive NAN discovery scheme. Thus, significant processing cycle and power usage gains may be realized.

The requesting device may receive a response to the cluster discovery message within the time period and use information in the response to join the NAN network or NAN cluster. As will be discussed in more detail below, the response may be a synchronization beacon sent during a discovery window or a discovery beacon sent at an unscheduled time during a discovery window interval. If a response is not received within the time period, the requesting device may send out additional requests and/or enter a power saving mode of operation where one or more NAN discovery operations are disabled for an amount of time. These and other details will become more apparent in the following description.

Various embodiments also relate to an apparatus or systems for performing these operations. This apparatus may be specially constructed for the required purpose or it may include a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method. The required structure for a variety of these machines will appear from the description given.

Reference is now made to the drawings, wherein like reference numerals are used to refer to like elements throughout.

In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates an exemplary embodiment of a communication system 100 in which aspect of the present disclosure may be employed. The wireless communication system 100 may operate pursuant to a wireless standard, such as an 802.11 wireless local area network (WLAN) standard, 802.15 wireless personal area network (PAN) standard, 802.22 wireless regional area network, and so forth. The wireless communication system 100 may include a cluster 102 of WiFi stations (STAs) 105. The STAs 105 may communicate directly with each other STAs 105 via one or more communication links. As an example, a first STA 105-1 may communicate with a second STA 105-2. As another example, a first STA 105-1 may communicate with a third STA 105-3. As clearly illustrated in FIG. 1A, any STA 105 may communicated with any other STA 105.

In various embodiments, a STA 105 may be embodied as a communication station, a mobile station, an advanced station, a client, a platform, a wireless communication device, an access point, a modem, a wireless modem, a Personal Computer (PC), a desktop computer, a mobile computer, a laptop computer, a notebook computer, a tablet computer, a server computer, a set-top box, a handheld computer, a handheld device, a Personal Digital Assistant (PDA) device, a handheld PDA device, and/or a netbook.

In embodiments, the STAs 105 can communicate in a wireless network such as a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing Next Generation mmWave (NGms-D02/r0, Nov. 28, 2008), Wireless Gigabit Alliance (WGA), IEEE 802.11, 802.11a, 802.11b, 802.11e, 802.11g, 802.11h, 802.11i, 802.11n, 802.11ac, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Maximum Ratio Combining (MRC) transceiver or device, a transceiver or device having "smart antenna" technology or multiple antenna technology, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), OFDMA, Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth®, ZigBee™, or the like. Embodiments may be used in various other apparatuses, devices, systems and/or networks.

In various embodiments, the STAs 105 in the communication system 100 may operate in accordance with the standards specification being developed by the Wi-Fi Alliance® related to Wi-Fi neighbor awareness networking (NAN) that enables device/service discovery based on Wi-Fi. In these embodiments, cluster 102 may be a NAN cluster that include devices or STAs 105 that share a common set of NAN parameters including time synchronization of discovery windows, time duration beacon intervals and time duration NAN channels. The STAs 105 may also be synchronized to the same discovery window schedule.

In some embodiments, to support the time synchronization, STAs 105 may share a master role that transmits synchronization beacons and discovery beacons on a periodic, semi-periodic or non-periodic basis. However, as will be discussed more detail below with respect to FIG. 1B, some embodiments may include an infrastructure device that may take on the master role permanently or for an extended period of time. Once a STA 105 takes on the master role, it may transmit a synchronization beacon during a discovery window and a number of discovery beacons outside of the discovery window during the discovery window interval. A discovery window is defined by a time period and channel on which STAs 105 in the same NAN cluster converge and communicate information on and may be 16 millisecond (ms) in length, for example. In various embodiments, the device assuming the master role may communicate a synchronization beacon once every discovery window interval or at 512 ms increments during a discovery window. The device may also communicate a discovery beacon every 100 ms on average with a maximum interval time of 200 ms between discovery beacons outside of the discovery window.

Figure 1B:
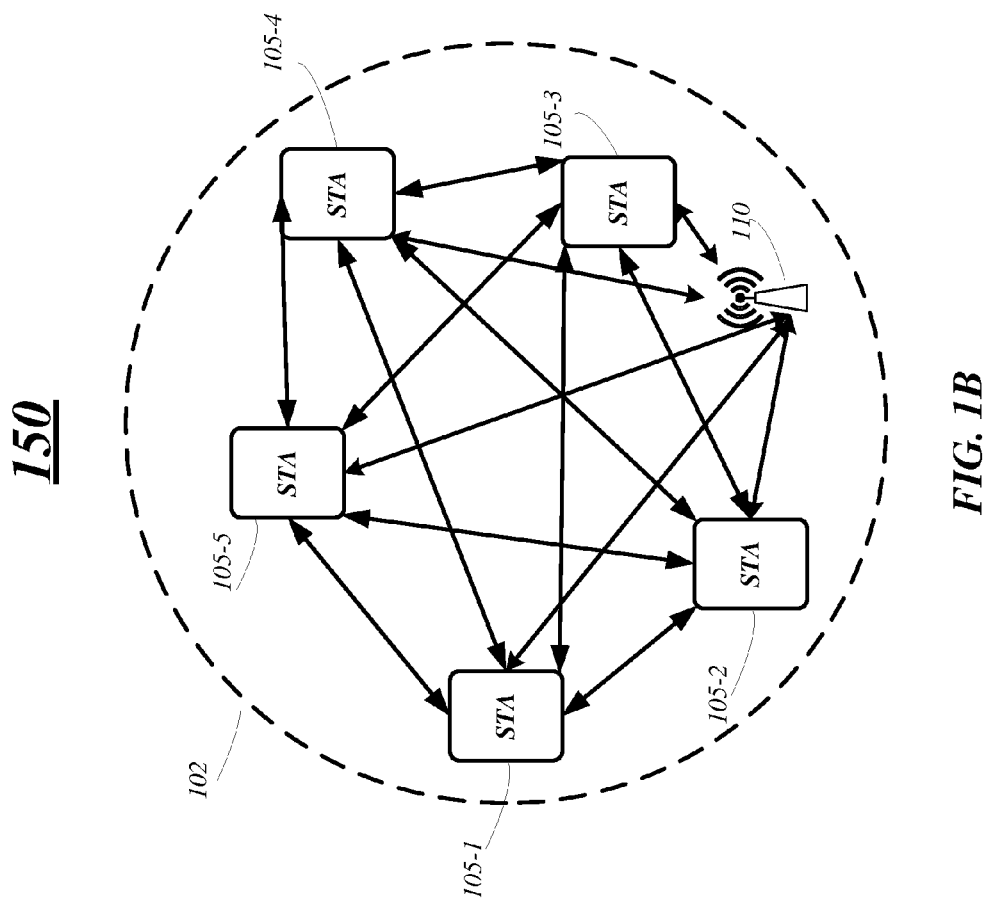
FIG. 1B illustrates a second exemplary embodiment of a communication system.

FIG. 1B illustrates a second exemplary embodiment of a communication system 150 including a cluster 102 of STAs 105 and an infrastructure device 110. In embodiments having an infrastructure device 110, the cluster 102 may be known as an infrastructure environment. The STAs 105 may communicate with the infrastructure device 110 in any manner as previously described above including, but not limited to, any one of the standards and techniques to communicate information. In some embodiments, a cluster 102 may include more than one infrastructure device 110 and various embodiments are not limited in this manner.

The infrastructure device 110 may be a computing device such as an access point or base station and provide wireless communication coverage in a basic service area. The infrastructure device 110 along with the STAs 105 may be referred to as a basic service set (BSS). In some embodiments, the infrastructure device 110 may act as an intermediary device to communicate information between the STAs 105. As previously discussed, an infrastructure device 110 may permanently or semi-permanently take on the master role. In these embodiments, none of the other STAs 105 will take on the master role while the infrastructure device 110 is operating as a master and the infrastructure device 110 will control the sending of the synchronization beacons and discovery beacons. It should be noted that the functions of the infrastructure device 110 described herein may alternatively be performed by one or more of the STAs 105 and an infrastructure device 110 is not limited to being an access point or base station.

Figure 2:
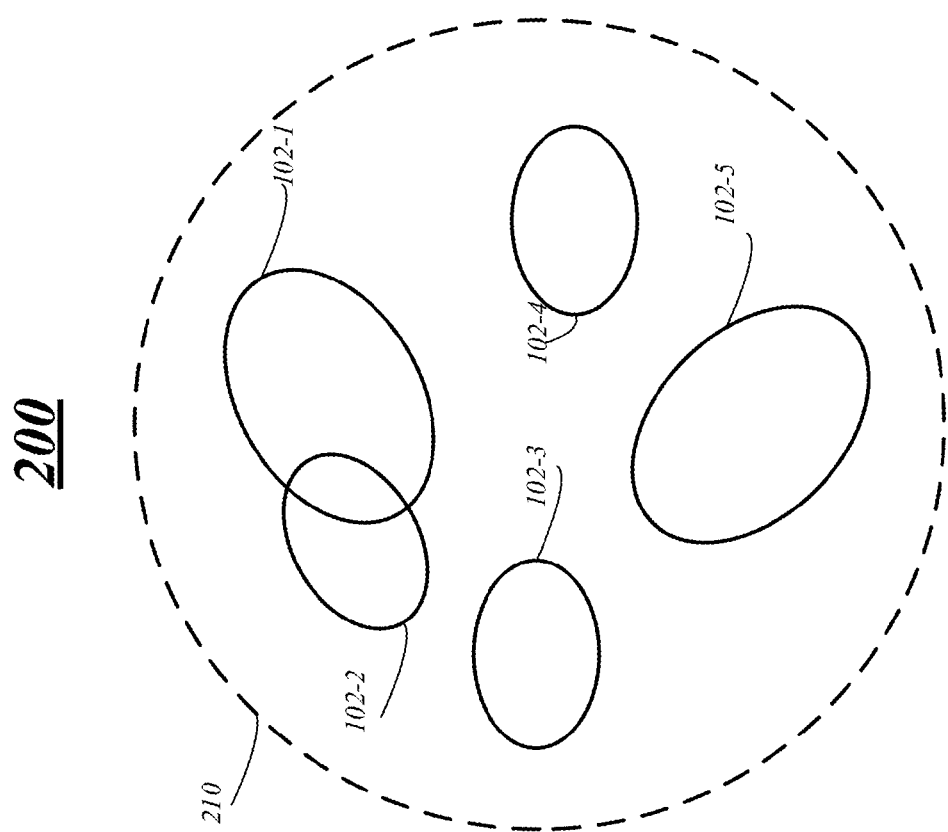
FIG. 2 illustrates a third exemplary embodiment of a communication system.

FIG. 2 illustrates a third exemplary embodiment of a communication system 200. More specifically, FIG. 2 illustrates a number of clusters 102 in a network 210. In some embodiments, network 210 may be a NAN network and clusters 102 may be NAN clusters. A NAN network may include STAs 105 and infrastructure devices 110 that share a common set of NAN parameters that include the time period between consecutive discovery windows, the time duration of the discovery windows, the beacon interval, and NAN Channel(s). Similarly, A NAN cluster may be a collection of STAs 105 that also share a common set of NAN parameters and are synchronized to the same discovery window schedule.

In FIG. 2, each of the clusters 102 may be the same as or similar to the cluster 102 previously described above in FIGS. 1A and 1B and may include any number of STAs 105 and infrastructure devices 110. In some of the embodiments, one or more of the clusters 102 may include only STAs 105 and operate as a PAN and other clusters 102 may be an infrastructure environment including infrastructure devices 110. For example, cluster 102-1 may only have STAs 105 and operate as a PAN and cluster 102-3 may include STAs 105 and at least one infrastructure device 110.

In some embodiments, the clusters 102 in the network 210 may communicate with each other via one or more communication links (not shown). For example, the clusters 102 may communicated via wirelessly according any one of the previous standards discussed, such as 802.11, 802.15, 802.22 and so forth. Further, some of the clusters 102 may overlap and include common devices. For example, one or more STAs 105 may be in two different clusters, as illustrated by clusters 102-1 and 102-2 overlapping in FIG. 2.

As will be discussed in more detail below, the network 210 and the clusters 102 may each have a NAN identification. More specifically, each network 210 may be identified by a unique NAN network identification and each cluster 102 may be identified by a unique NAN cluster identification. These NAN identifications may be used by a device or STA 105 when actively searching for a network 210 or cluster 102 to join.

Figure 3:
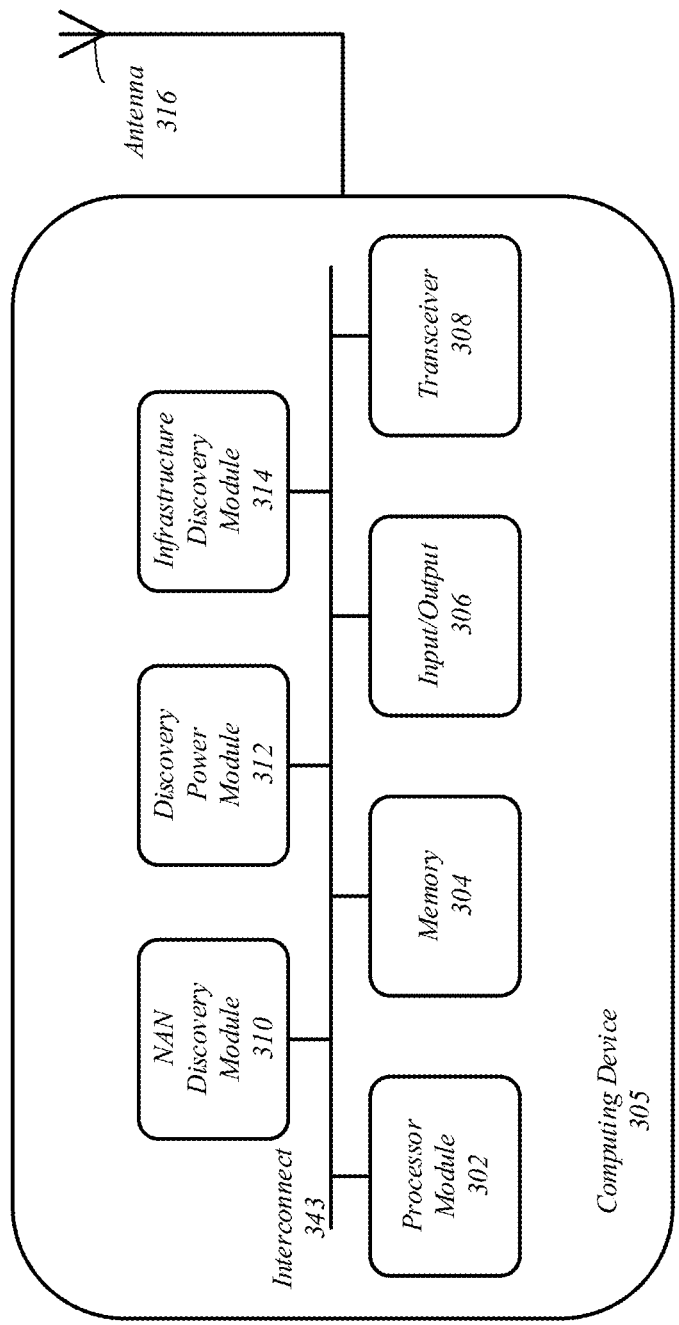
FIG. 3 illustrates an embodiment of a computing device.

FIG. 3 illustrates an exemplary embodiment of a computing device 305 that may be employed in a communication system, such as communication systems 100, 150 and 200, previously discussed above. The computing device 305 is an example of a device that may be configured to implement the various features described herein. For example, the computing device 305 may include the infrastructure device 110 or a STA 105.

The computing device 305 may include a processor module 302 which controls one or more operation of the computing device 305. The processor module 302 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. For example, the processor component 302 may include a graphical processing unit (GPU) for processing graphical and video information, in various embodiments. In other embodiments, computing device 305 may include a separate GPU. Although FIG. 3 only illustrates one processor module 305 various embodiments are not limited in this manner and the computing device 305 may include any number of processor modules having any number of cores. The processor module 302 may be connected to and communicate with the other elements of the computing system via an interconnect 343, such as one or more buses, control lines, and data lines.

Memory 304 may include one or more of random access memory (RAM), read-only memory (ROM), electrically erasable programmable read-only memory (EEPROM), flash memory, and hard disk memory. The memory 304 is not limited to these memory components. For example, the memory 304 may include a non-transitory computer-readable storage medium. These memory components can store data momentarily, temporarily, or permanently. The memory 304 stores instructions and data for computing device 305. The memory 304 may also store temporary variables or other intermediate information while the processor module 302 is executing instructions. In some embodiments, the memory 304 is configured to store various types of data, including, without limitation, information and content for communicating in NAN networks and clusters.

Computing device 305 may also include an input/output (I/O) module 306 including at least one of an input device, such as one or more buttons, a keyboard, a keypad, a touchscreen display, a touch sensitive device, a microphone, a camera or any other device used for inputting information into the device. Further, the I/O module 306 may also include one or more output devices, such as a display device, a speaker, a haptic feedback device, one or more light emitting diodes, a buzzer, a vibration device, and so forth. The I/O module 306 may be used to input any information or data into the computing device 305 and outputting information for user, for example.

The computing device 305 may include a transceiver 308 coupled with an antenna 316 for reception and transmission of information, messages, packets, frames and so forth between other devices. In some embodiments, transceiver 308 may include a transmitter and a receiver to allow transmission and reception of data between the computing device 305 and a remote location. The transmitter and receiver may be combined into the transceiver 308. The antenna 316 may be attached to the computing device 305 and electrically coupled to the transceiver 308. The computing device 305 may also include (not shown) multiple transmitters, multiple receivers, multiple transceivers, and/or multiple antennas.

The transceiver 308 may be configured to wirelessly transmit information in packets, frames, messages, etc. having different types or functions. The transceiver 308 may be configured to process and transmit messages of different types including messages, beacons, probe requests, probe responses, or any other type of frame or packet. For example, the processor module 302 may communicate a cluster discovery message when actively looking for a NAN cluster or NAN network to join. When the computing device 305 is implemented or used as an infrastructure device 310, the processor module 302 may also be configured to communicate a response and other beacons, for example.

The transceiver 308 may be configured to wirelessly receive messages having of different types. For example, when the computing device 305 is operating as STA, the transceiver 308 may receive messages, responses, beacons, and so forth. In another example, when the computing device 305 is operating as an infrastructure device, the transceiver 308 may receive a cluster discovery message. Various embodiments are not limited to these examples other information, messages, packets, frames and so forth may be communicated by transceiver 308.

The computing device 305 may also include a NAN discovery module 310 to actively search for NAN networks and NAN clusters to join. More specifically, the NAN discovery module 310 may communicate a cluster discovery message to join a NAN network or NAN cluster, wait and receive a response to the cluster discovery message, and join the NAN network or NAN cluster based on the response. In various embodiments, the NAN discovery module 310 may be implemented in software only, hardware only, or both. For example, the NAN discovery module 310 may be implemented as a set of one or more instructions to perform NAN discovery operations stored in memory or storage and executed by the processor module 302. In another example, the NAN discovery module 310 may be implemented as one or more circuits in processing circuitry. However, various embodiments are not limited in this manner.

The NAN discovery module 310 may communicate the cluster discovery message to join or search for a NAN network or NAN cluster by broadcasting, unicasting or multicasting the message over one or more wireless links according to a wireless standard, such as 802.11 or 802.15. For example, the cluster discovery message may be broadcasted wirelessly via the transceiver 308 and antenna 316 for other devices to receive. In another example, the cluster discovery message may be communicated using a multicast address and sent to one or devices. However various embodiments are not limited in this manner.

The cluster discovery message may be communicated as one or more frames, packets or in some other manner, and in some embodiments, may be a probe request message or a cluster discovery frame. However, various embodiments are not limited in this manner and the cluster discovery message may be communicated as any type of frame or packet.

In various embodiments, the cluster discovery message may include a NAN identification to identify a NAN network or NAN cluster. The NAN identification may be any combination of numbers, letters, symbols and so forth to uniquely identify a NAN network or NAN cluster. When the NAN discovery module 310 is searching for a NAN network to join, the NAN identification may be a NAN network identification. The NAN network identification may be a media access control (MAC) address or a multicast address to identify a NAN network. When the NAN discovery module 310 is searching for a NAN cluster to join, the NAN identification may be a NAN cluster identification. The NAN cluster identification may also be a MAC address and may be used when communicating every frame sent for a NAN communication.

The NAN discovery module 310 may also wait for and receive a response to the cluster discovery message. The response may be received in various forms such as a synchronization beacon, a discovery beacon, a probe response, or any other type of frame or packet. Moreover, the response may be received in any manner including a broadcast message, a multicast message, or a unicast message.

In various embodiments, the response may be received from an infrastructure device 110 or a STA 105 operating as a master. For example, an infrastructure device 110 identified in a cluster discovery message may generate and send a response to the cluster discovery message. The response may include information such as a NAN identification, and a timestamp offset to synchronize its clock with the other STAs in the NAN cluster. More specifically, the computing device 305 including the NAN discovery module 310 may use the timestamp offset to synchronize an internal clock with a time synchronization function (TSF) time used in a NAN network or NAN cluster.

The NAN discovery module 310 may only wait for a specified amount of time after communicating the cluster discovery message to receive a response. If a response is not received in the specified amount of time, the NAN discovery module 310 may resend the cluster discovery message. In some embodiments, if a response is not received within the specified amount of time, the NAN discovery module 310 may send information to the discovery power module 312 to disable NAN discovery operations. For example, if a response is not received within the specified amount of time, the computing device 305 may not be near a NAN network or NAN cluster to join and the discovery power module 312 may disable NAN discovery operations to save power. The specified amount of time may be on the order of milliseconds, such as 10 ms and may be based on the length of a discovery window.

In various embodiments, the computing device 305 including the NAN discovery module 310 may join a NAN network or NAN cluster based on the response received. For example, the NAN discovery module 310 may receive the response including the timestamp offset and may join the cluster by syncing its internal clock with the TSF time of the NAN network or NAN cluster. If more than one NAN cluster sends a response, the NAN discovery module 310 may pick a NAN cluster to join based on a number of factors, such as the NAN cluster having the highest grade according to in the Wi-Fi Alliance® NAN Technical Specification. Once the computing device 305 joins a NAN network or NAN cluster it may communicate information in one or more frames and include the NAN identification in each of the frames. Information may be communicated with any STA 105 or infrastructure device 110 within the NAN network or NAN cluster.

In some embodiments, the computing device 305 may operate as an infrastructure device 110. For example, the computing device 305 may be an access point or a base station, or may be STA 105 having the master role in a NAN cluster. In these embodiments, the NAN discovery module 310 may receive the cluster discovery message, generate and send a response and provide other services for the NAN network or NAN cluster. For example, the NAN discovery module 310 may also send out synchronization beacons during discovery windows and discovery beacons during a discovery window intervals on a periodic, semi-periodic, or non-periodic basis.

In some embodiments, the NAN discovery module 310 may send the response as a synchronization beacon or a discovery beacon. Generally, the synchronization beacons and discovery beacons may include information that can be used by the receiving device to join a NAN cluster or NAN network. For example, the synchronization beacon may include an address of the sending device, a NAN identification, and a timestamp offset such as a TSF timer value that may be used by the receiving device to set its internal clock such that it is aligned with the clocks of other STAs and device. Typically, an infrastructure device 110 or STA 105 acting as a master may communicate a synchronization beacon once in every discovery window.

In another example, the response may be a discovery beacon which may be transmitted more than once a discovery window interval and may also include a sender's address, a NAN identification and a TSF timer and among other information. Various embodiments are not limited to these examples and in some embodiments the response may be a probe response or any other type of response frame that may include information to join a NAN cluster.

In some embodiments, the NAN discovery module 310 may adjust the communication of beacons and frames when a response is sent based on the cluster discovery message. More specifically, the communication of the synchronization beacon or the discovery beacon as a response may occur at an unscheduled time. Thus, the communication of the next scheduled synchronization beacon or discovery beacon may need to be adjusted.

For example, the NAN discovery module 310 may cancel the next scheduled synchronization beacon when it sends a synchronization beacon as a response to the cluster discovery message. As previously mentioned, a synchronization beacon may only be sent once a discovery window. Thus to satisfy this configuration, when a synchronization beacon is sent as a response the next scheduled may be canceled so that only one is sent during the discovery window.

In another example, when a discovery beacon is sent as a response, the NAN discovery module 310 may adjust the communication of the next discovery beacon such that it occurs within a certain amount of time of sending the discovery beacon as a response, i.e., within a maximum interval time such as 200 ms. Various embodiments are not limited in this manner and the communication of the beacons may be adjusted in other ways.

The computing device 305 may also include a discovery power module 312 to control and manage one or more operations to perform a NAN discovery operation. For example, the discovery power module 312 may disable or enable the NAN discovery operation at certain times or based on certain events, such as not receiving a response to a cluster discovery message, the failure to detect an infrastructure environment and when the device is operating as a master device for a certain time.

For example, the NAN discovery module 310 may communicate a cluster discovery message to actively find a NAN network or NAN and wait for a time period or an order of milliseconds, such as 10 ms, for a response. When the NAN discovery module 310 does not receive a response within the time period, it may instruct or communicate information to the discovery power module 312 to disable the NAN discovery operation. In some embodiments, the NAN discovery module 310 may send a cluster discovery message a number of times before disabling the NAN discovery operation.

In another example, the discovery power module 312 may disable the NAN discovery operation when the computing device 305 cannot detect a NAN network or NAN cluster operating in an infrastructure environment during a scanning process. More specifically, an infrastructure discovery module 314 may scan for one or more infrastructure devices, and if at least one cannot be located, it may instruct or communicate information to the discovery power module 312 to disable the NAN discovery operation.

In third example, the discovery power module 312 may disable the NAN discovery operation on a computing device 305 operating in the master role for longer than a determined amount of time. The determined amount of time may be on the order of seconds, such as 5 seconds (sec), 8 sec, 10 sec, and so forth and may be determined by a user, an administrator, or manufacture of the device. In some embodiments, the determined amount of time may be defined by the Wi-Fi Alliance® NAN Technical Specification.

The discovery power module 312 may disable the NAN discovery operation to conserve power usage and battery life on computing devices, for example. In various embodiments, the discovery power module 312 may disable the NAN discovery operation be prohibiting the execution of one or more operations, such as the communication of a cluster discovery message, waiting for and receiving a response, and scanning for an infrastructure environment. The discovery power module 312 may also disable, power off or put into a sleep mode certain processing circuitry, such as the transceiver 306 and various parts of the processor module 302. In various embodiments, the discovery power module 312 may disable the NAN discovery operation for a certain amount of time and then enable the operations to search for a NAN cluster or NAN network to join. A user of the computing device 305 may enable the NAN discovery operation via one or more inputs.

The computing device 305 may include an infrastructure discovery module 314 to perform scanning operations to scan for infrastructure devices 110. For example, the infrastructure discovery module 314 may communicate one or more broadcast messages having scanning information to locate an infrastructure device 110. The broadcast messages may be sent on a periodic, semi-periodic, or non-periodic basis. Typically, if an infrastructure device 110 receives the broadcast message with scanning information it will send a response indicated that it is available for communication as an infrastructure device 110. When a response is not received from any infrastructure device 110 within a determined amount of time, the infrastructure discovery module 314 may instruct or communicate information to the discovery power module 312 to disable a NAN discovery operation, as previously discussed. The determined amount of time may be configured by a user or administrator of the computing device or defined by the Wi-Fi Alliance® NAN Technical Specification.

Figure 4A:
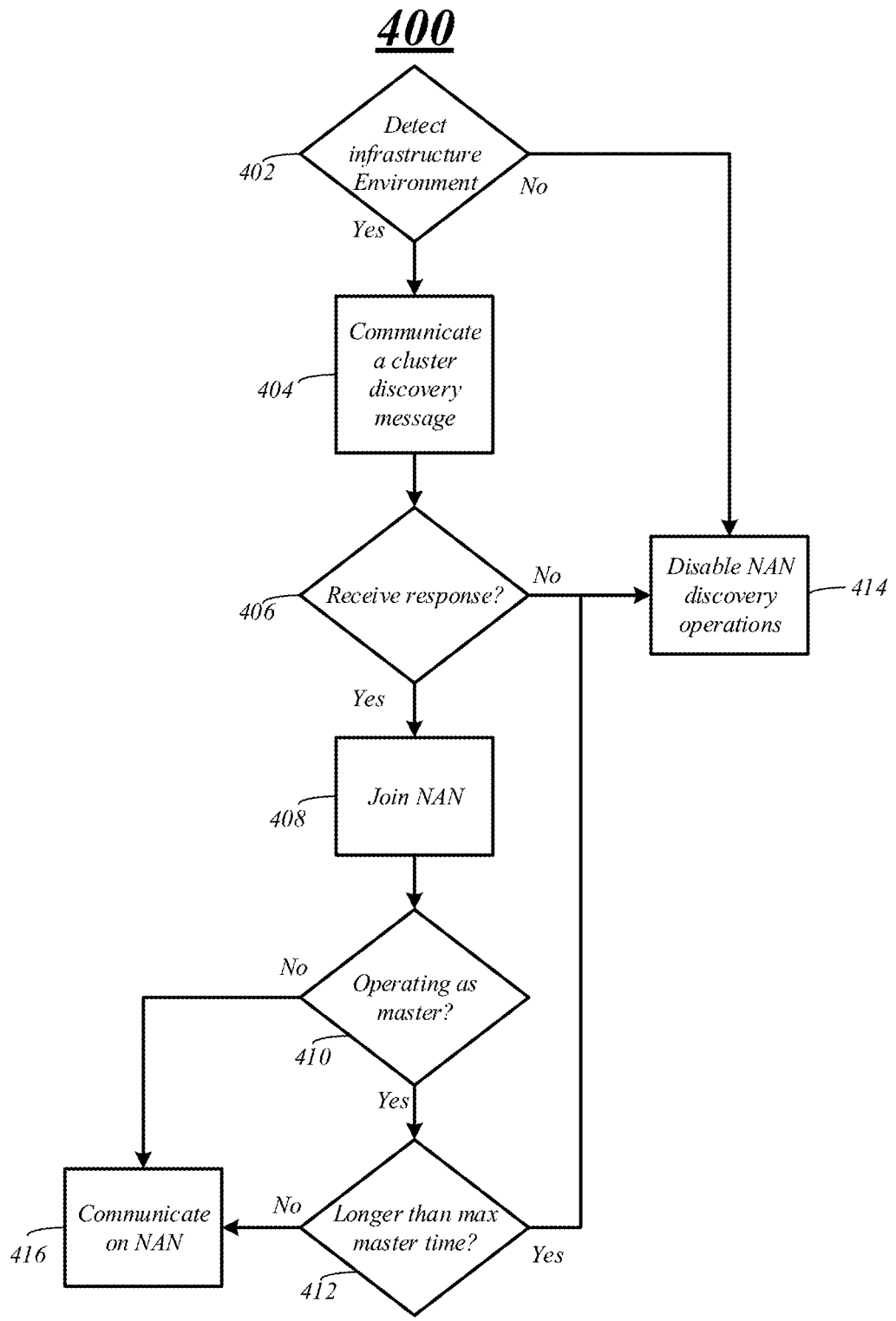
FIG. 4A illustrates an exemplary embodiment of a logic flow.

FIG. 4A illustrates a first logic flow 400 to actively locate a NAN network or a NAN cluster. Logic flow 400 may be representative of some or all of the operations executed by one or more embodiments described herein. For example, the logic flow 400 may illustrate operations performed by the systems 100, 150, 200 and computing device 305. In some embodiments, logic flow 400 may be performed by a computing device 305 operating as a STA 105 searching for a NAN network or NAN cluster.

At decision block 402, a scanning operation may be performed to detect an infrastructure environment. For example, a computing device 305 including an infrastructure discovery module 314 may perform a scanning operation by sending one or more broadcast messages searching for an infrastructure device 110, such as an access point or base station, or a STA 105 operating in a master role. The computing device 305 may wait for a determined amount of time for a response or a message from an infrastructure device 110 or a STA 105 and if it does not receive a response, the computing device 305 may perform another scanning operation or may disable the NAN discovery operation at block 414.

When the computing device 305 does find an infrastructure device 110 and a NAN network or NAN cluster is operating as an infrastructure environment, a cluster discovery message may be communicated at block 404. For example, a NAN discovery module 310 may communicate a cluster discovery message, such as a probe request frame or any other type of frame to one or more devices in the NAN network or NAN cluster. In some embodiments, the cluster discovery message may be communicated as a broadcast message, a multicast message including a multicast address, or a unicast message. In some embodiments, the cluster discovery message may include a NAN identification, such as a NAN network identification to identify a NAN network to join or a NAN cluster identification to identify a NAN cluster to join.

At decision block 406, a determination may be made as to whether a response has been received or not received. In some embodiments, the NAN discovery module 310 may wait a determined amount of time for a response to the cluster discovery message. The determined amount of time may be on the order of milliseconds (ms), such as 10 ms. If a response is not received from a device, such as an infrastructure device 110 or another STA 105, the NAN discovery operations may be disabled at block 414.

If a response is received, the computing device 305 may join a NAN network or NAN cluster based on the response at block 408. The NAN discovery module 310 may join a NAN network or NAN cluster by using information in the response, such as a NAN identification and a timestamp offset to synchronize its clock with the other STAs and infrastructure devices in the NAN network or NAN cluster, for example. The computing device 305 may continue to operate in the NAN network or NAN cluster by sending and receiving information with other STAs and devices.

At certain times, the computing device 305 may take on a master role for the NAN network or NAN cluster once it is operating in the network or cluster. At decision block 410, the computing device 305 may determine whether it is operating at as a master. If the computing device 305 is not operating as master, it may continue to operate and communicate in the NAN network or NAN cluster. However if the computing device is 305 operating as a master, a decision may be made as to whether the computing device is operating as a master for longer than a max master time threshold at decision block 412. The max master time threshold may be a determined amount of time in which the computing device 305 is operating as a master indicating that it is no longer in a NAN network or NAN cluster. For example, if the computing device 305 has been the master for a number of seconds, such as 5 or 10 seconds, the device may no longer be within range of other STAs 105 or infrastructure device 110 that can take over the master role. When this occurs, the computing device 305, and in particular, the discovery power module 312 may disable the NAN discovery operations at block 414. However, if the computing device 305 is operating as the master for less than the max master time, it may continue to operate in the NAN network or NAN cluster in a normal operating manner at block 416. Although FIG. 4A illustrates a number of blocks occurring a specific order, various embodiments are not limited in this manner and different blocks may occur before or after other blocks.

Figure 4B:
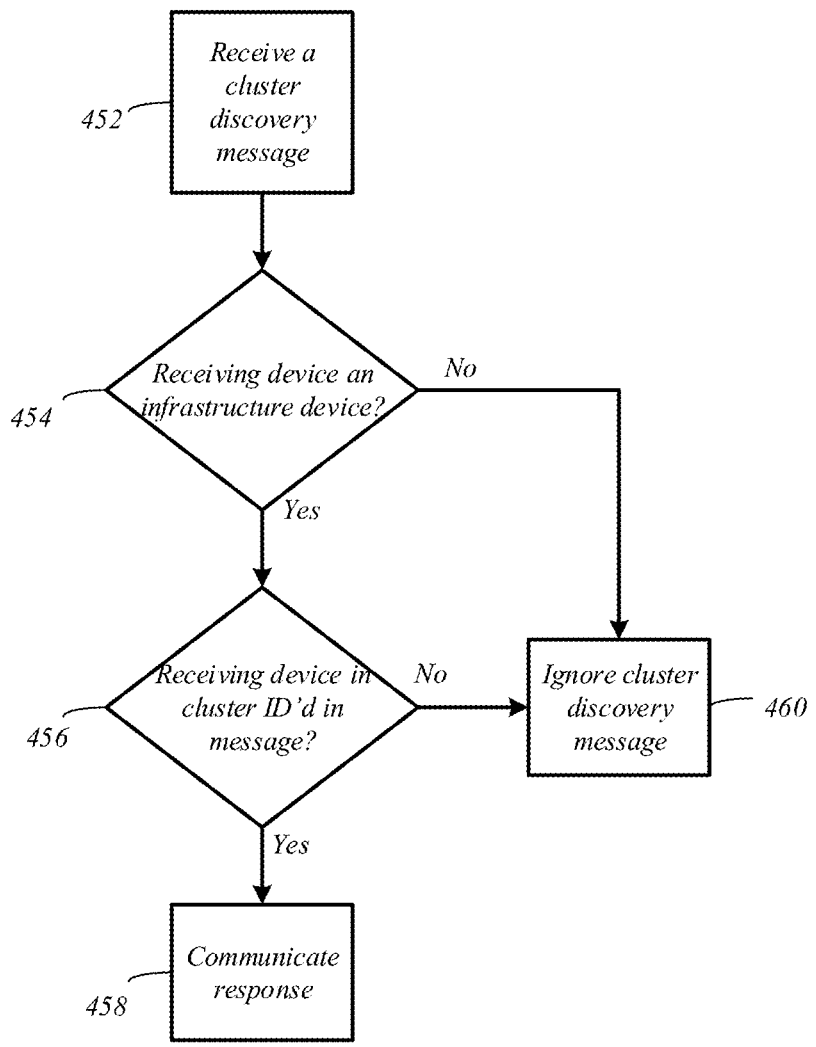
FIG. 4B illustrates a second exemplary embodiment of a logic flow.

FIG. 4B illustrates a second logic flow 450 to process a cluster discovery message. Logic flow 450 may be representative of some or all of the operations executed by one or more embodiments described herein. For example, the logic flow 450 may illustrate operations performed by the systems 100, 150, 200 and computing device 305. In some embodiments, logic flow 450 may be performed by a computing device 305 operating as an infrastructure device 110.

At block 452, a cluster discovery message may be received by a computing device 305. The cluster discovery message may have been sent as a broadcast message, a multicast message, a unicast message, and so forth and may include a NAN identification to identify a NAN network or NAN cluster that it desires to join. The receiving device may make a determination as to whether it is an infrastructure device 110 at block 454. An infrastructure device 110 may be any device such as an access point, a base station, or a STA 105 operating as a master. If the receiving device is not an infrastructure device 110 it may ignore the cluster discovery message at block 460.

However, if the receiving device is an infrastructure device 110, it may make a determination as to whether it is in a NAN network or NAN cluster identified in the cluster discovery message. As previously mentioned, the cluster discovery message may include a NAN identification and the infrastructure device 110 may use the NAN identification for making the determination at block 456. If the infrastructure device 110 is not identified in the cluster discovery message, it may ignore the message at block 460. However, if the infrastructure device 110 is in the identified NAN network or NAN cluster it may communicate a response at block 458.

The infrastructure device 110 may communicate the response in a number of different way including sending a synchronization beacon, a discovery beacon, a probe response or in any other type of frame. In some embodiments, the response may include information such as a NAN identification and a timestamp offset to synchronize its clock with the other STAs in the NAN cluster or a NAN network. Once a response is communicated, the device or STA sending the cluster discovery message may join the NAN network or NAN cluster based on information in the response.

Figure 5A:
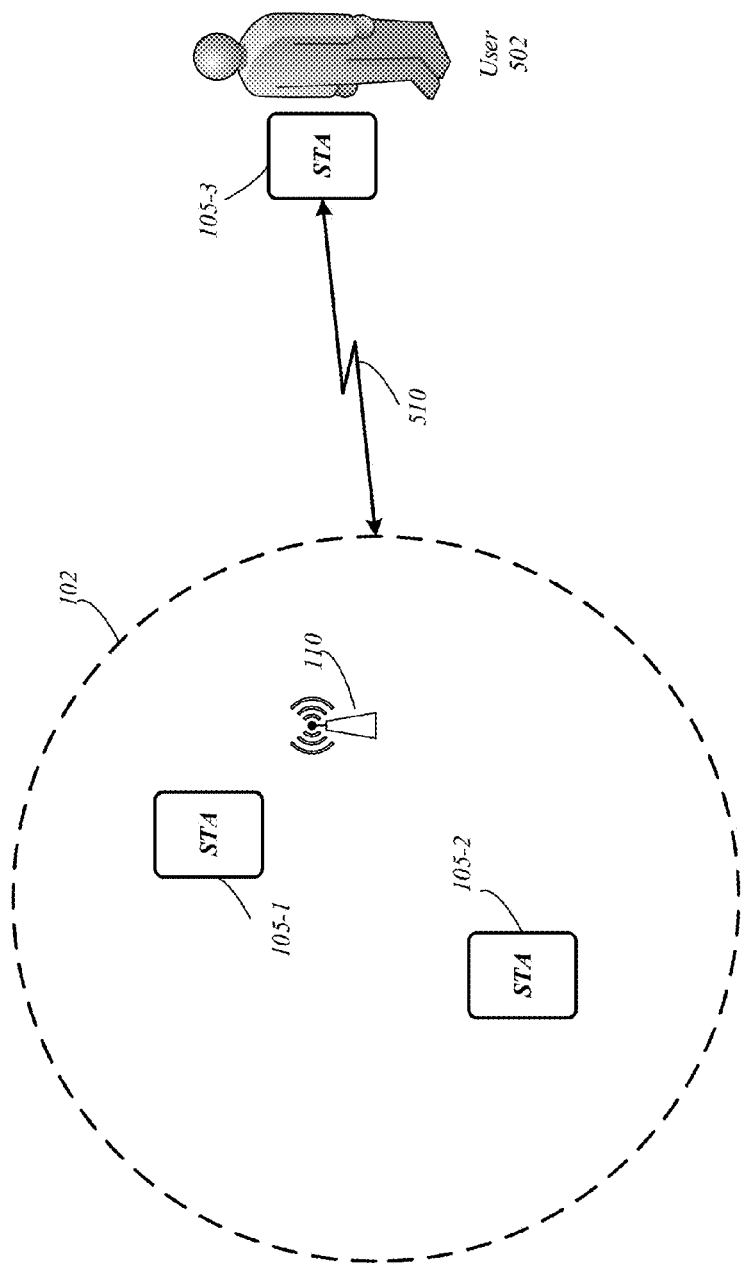
FIG. 5A illustrates a third exemplary embodiment of a communication system.

FIG. 5A illustrates an exemplary embodiment of a communication system 500 including a cluster 102 and a user 502 having a STA 105-3. In this illustrated embodiment, the STA 105-3 may be performing a scanning procedure as indicated by line 510. In this example, a user 502 may be entering an area with a cluster 102 and may initiate a scanning procedure. In some embodiments, the STA 105-3 may perform a scanning procedure on a periodic, semi-period or non-periodic basis without user interaction. Various embodiments are not limited in this manner.

As previously discussed, the STA 105-3 may perform the scanning procedure by sending or communicating a broadcast scanning message searching for an infrastructure device 110, such as an access point, base station, or a STA 105 operating as a master. In this illustrated example, STA 105-3 may communicate the broadcast scanning message and may receive a response from one or more devices in the cluster 102. For example, at least one of the STAs 105-1 and 105-2 or the infrastructure devices 110 may communicate a response to the scanning procedure indicating that the cluster 102 is or is not an infrastructure environment. In this exemplary embodiment, cluster 102 is an infrastructure environment and the STA 105-3 may receive a response indicating as such. The STA 105-3 may perform one or more operations to join the cluster 102, as discussed below with respect to FIG. 5B.

Figure 5B:
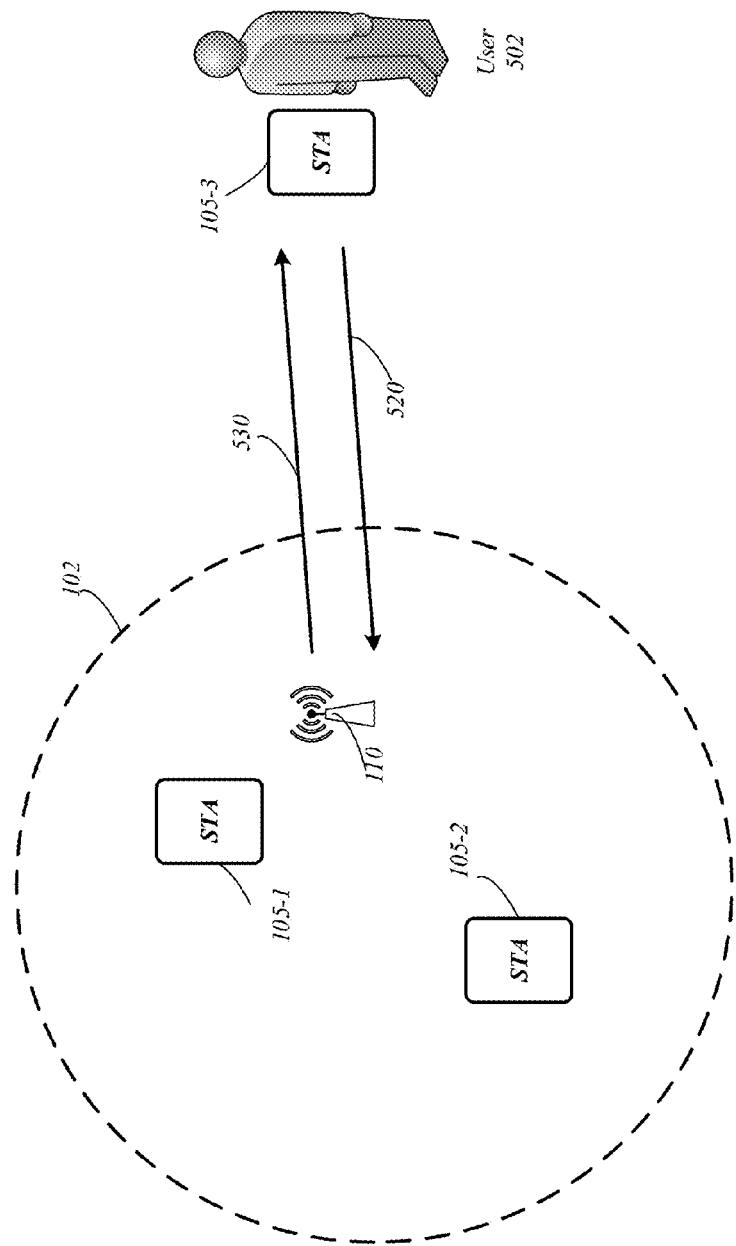
FIG. 5B illustrates a fourth exemplary embodiment of a communication system.

FIG. 5B illustrates an exemplary embodiment of a communication system 550 which may be similar to or the same as communication system 500 of FIG. 5A. For example, communication system 550 may include a cluster 102 having STAs 105-1 and 105-2 and an infrastructure device 110 and a user 502 having a STA 105-3. FIG. 5B illustrates an exemplary embodiment after STA 105-3 locates the cluster 102 as an infrastructure environment as previously discussed above in FIG. 5A.

Once STA 105-3 performs a scanning operation and detects and infrastructure device 110, the STA 105-3 may communicate a request, such as a cluster discovery message to actively join the cluster 102 at line 520. In various embodiments, the cluster discovery message may include information such as a NAN identification to ensure that cluster 102 is the cluster in which STA 105-3 wants to join. One or more of the devices, such as STAs 105-1, 105-2 or infrastructure device 110 may receive the request and may send a response. For example, infrastructure device 110 may receive the cluster discovery message and may send a response at line 530. The response may be a synchronization beacon, a discovery beacon, or any other type of frame and may include information such as a NAN identification and a timestamp offset to synchronize its clock with the other STAs in the cluster 102. The STA 105-3 may then use this information to join the cluster 102 by synchronizing its clock with the other device's clocks in the cluster 102. Once the STA 105-3 joins the cluster 102 it may communicate information with the STAs 105-1, 105-2 and the infrastructure device 110 in accordance with a NAN cluster architecture.

FIGS. 6A/6B/6C illustrate exemplary embodiments of timing diagrams 600, 625 and 650 for an infrastructure device 110 and a STA 105. More specifically, FIG. 6A illustrates a timing diagram 600 while an infrastructure device 110 is operating as a master in a NAN cluster. In some exemplary embodiments, an infrastructure device 110 may communicate a number of beacons, such as synchronization beacons 602 and discovery beacons 604.

As previously discussed, the infrastructure device 110 may communicate one synchronization beacon 602 during every discovery window 608 which may be defined by the communication of synchronization beacons 602 and may be 16 ms length, for example. In some embodiments, the time between each synchronization beacon 602 and the length of the discovery window interval 606 may be 512 ms, for example. Further, the infrastructure device 110 may also communicate one or more discovery beacons 604 on a periodic, semi-periodic or non-periodic basis during the discovery window interval 606. On average, a discovery beacon 604 may be communicated by the infrastructure device 110 every 100 ms, however, the max time between discovery beacons 604 may be 200 ms. In other words, a discovery beacon 604 must be communicated at least once every 200 ms. Various embodiments are not limited in this manner and the max time between discovery beacons 604 may be any amount of time and may be defined in the Wi-Fi Alliance® NAN Technical Specification, for example.

In various embodiments, the synchronization beacons 602 and the discovery beacons 604 may be used by a STA 105 to join a NAN cluster. FIG. 6B illustrates an embodiment of a STA 105 passively searching for a NAN cluster to join during a cluster discovery interval 631. In embodiments, a STA 105 may be in a sleep state 627 where one or more circuits and/or operations may be disabled for a period time. The STA 105 may wake up and passively search for a NAN cluster during an awake period 629. When passively searching for a NAN cluster, the STA 105 must stay awake until it receives either a synchronization beacon 602 or a discovery beacon 604. However, since the STA 105 is passively searching for the NAN cluster, a beacon will not be sent in response to a request, such as a cluster discovery message. Thus, the STA 105 may have to stay awake for as long as the max time between discovery beacons, e.g., 200 ms, and on average 100 ms based on the average time between discovery beacons. A considerable amount of power may be consumed while a STA 105 is passively looking for a NAN cluster to join.

FIG. 6C illustrates a STA 105 performing an active search for a NAN cluster. In this example, the STA 105 may be a sleep state 627 for an amount of time. The STA 105 may wake up from the sleep state 627 and send a cluster discovery message 652 to solicit a response from one or more devices, such as other STAs 105 or infrastructure devices 110 of a NAN cluster. The STA 105 may be configured such that it only stays awake during the awake state 629 for a determined amount of time, such as 10 ms. If the STA 105 does not receive a response within this amount of time it may be put back into a sleep state 627 and a NAN discovery operation may be disabled. Thus, as can be seen by FIG. 6C when the STA 105 actively searches for a NAN cluster it may spend less time in an awake state 629. Further and as illustrated below, even when communicating a cluster discovery message 652 significant power advantages may be realized by actively searching for a NAN cluster.

Figure 7:
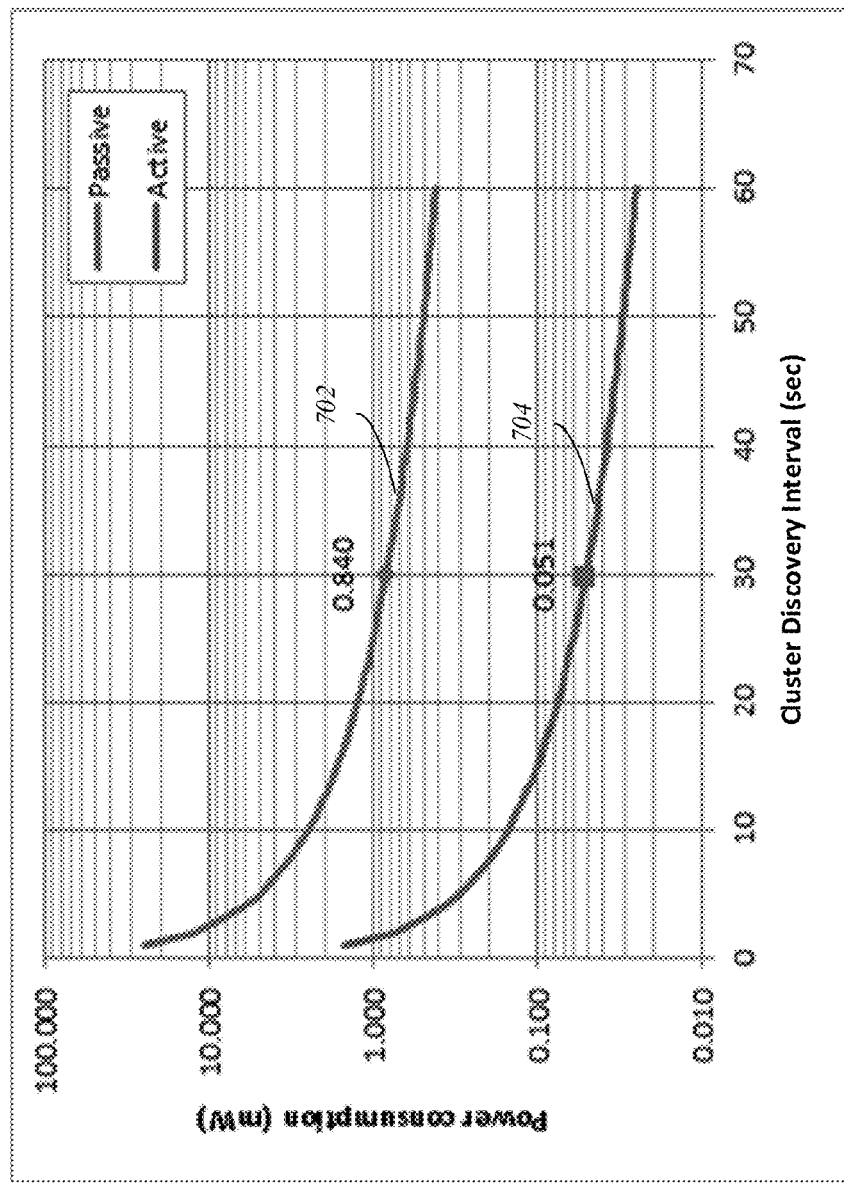
FIG. 7 illustrates an exemplary embodiment of a power consumption graph.

FIG. 7 illustrates an exemplary embodiment of a power consumption graph 700 for both passively and actively searching for NAN clusters at different NAN cluster discovery intervals. As clearly illustrated in this graph showing experimental results, an active NAN cluster discovery scheme, as discussed herein, can reduce power consumption significantly compared to a passive NAN cluster discovery scheme. Line 702 illustrates the power consumption of a STA 105 during a passive NAN cluster discovery scheme and line 704 illustrates the power consumption of a STA 105 during an active NAN cluster discovery scheme. In one example, when the NAN cluster discovery interval is 30 seconds, the power consumption of a STA 105 is 840 uW during a passive NAN cluster discovery scheme and is 51 uW during an active NAN cluster discovery scheme. Various embodiments are not limited to this example and as can be seen in FIG. 7 power savings may be realized using an active NAN cluster discovery scheme for any discovery interval.

FIG. 8A illustrates one embodiment of a logic flow 800. The logic flow 800 may be representative of some or all of the operations executed by one or more embodiments described herein. For example, the logic flow 800 may illustrate operations performed by systems 100, 150, 200 and computing device 300. In the illustrated embodiment shown in FIG. 8A, the logic flow 800 may include performing neighbor awareness network (NAN) discovery operations to discover a NAN cluster comprising one or more devices synchronized to a discovery window at block 805.

In various embodiments, the NAN discovery operations may include communicating a cluster discovery message to join the NAN cluster at block 810. The cluster discovery message may be sent in any manner, such as broadcast, multicast, or unicast and may include information such as a NAN identification to identify a NAN network or NAN cluster to join.

The logic flow 800 may also include determining whether a response to the cluster discovery message is received within a first time period at block 815. For example, the STA communicating the cluster discovery message may wait a determined amount of time, such as 10 ms for a response. At block 820, the logic flow 800 may include joining the NAN cluster based on information in the response to synchronize to the discovery window when the response is received within the first time period. As previously mentioned, the response may include information such as a NAN identification and a timestamp offset to synchronize its clock with the other STAs and infrastructure devices in the NAN cluster. The STA performing the NAN discovery operations may use the timestamp offset to synchronize its clock with these other devices and to sync to the same discovery window.

However, the logic flow 800 at block 825 may also include disabling one or more operations to perform the NAN discovery operations when the response is not received within the first time period. For any number of reasons the STA may not receive a response within the determined amount of time. For example, the STAs sent the cluster discovery message may be out of range, the NAN cluster may not have any infrastructure, wireless traffic may cause latency in receiving the response, and so forth. Thus, the STA may disable the NAN discovery operations to conserve power and battery life when it does not receive a response within the first time period. In some embodiments, the STA may disable the NAN discovery operation for an amount of time or until a user enables it to perform another NAN discovery operation. Various embodiments are not limited in this manner.

Figure 8B:
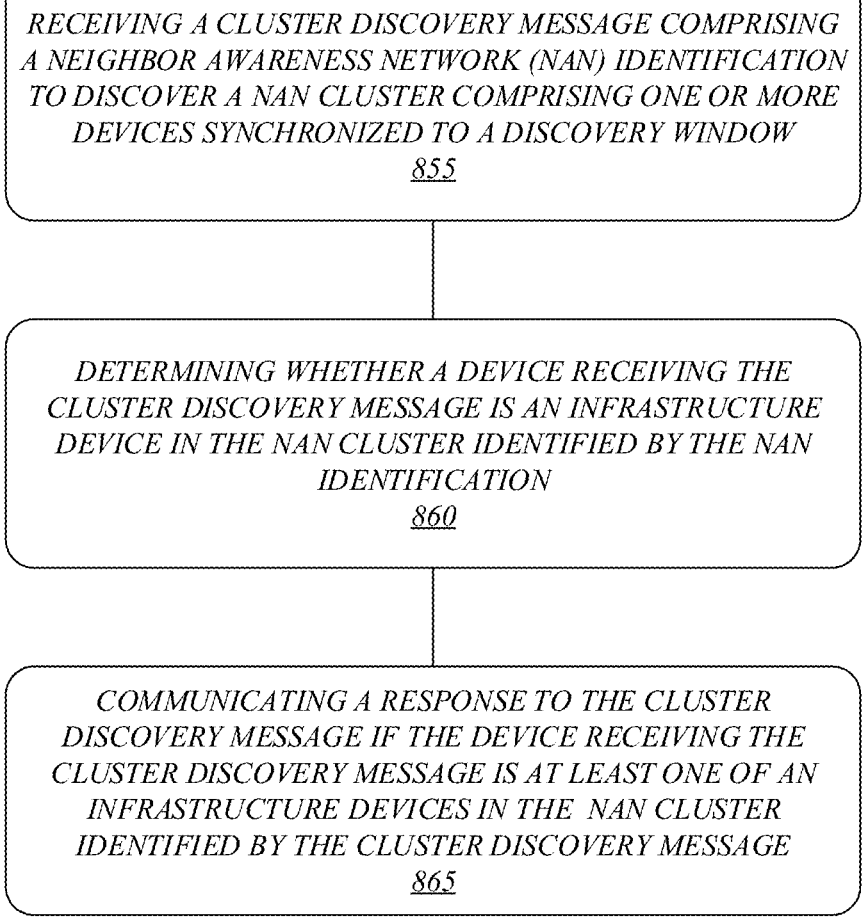
FIGS. 8A/8B illustrate exemplary embodiments of logic flows.

FIG. 8B illustrates one embodiment of a logic flow 850. The logic flow 850 may be representative of some or all of the operations executed by one or more embodiments described herein. For example, the logic flow 850 may illustrate operations performed by systems 100, 150, 200 and computing device 305. In the illustrated embodiment shown in FIG. 8B, the logic flow 850 may include receiving a cluster discovery message comprising a neighbor awareness network (NAN) identification to discover a NAN cluster comprising one or more devices synchronized to a discovery window at block 855. The cluster discovery message may be received as broadcast message, a multicast message, or a unicast message, and may have been sent from a STA searching for a NAN cluster to join.

The logic flow 850 may also include determining whether a device receiving the cluster discovery message is an infrastructure device in the NAN cluster identified by the NAN identification at block 860. In some embodiments, the receiving device may be an infrastructure device if it is an access point, base station, or a STA operating as a master in the NAN cluster. Various embodiments are not limited to these examples and other devices configured in a particular manner defined by the Wi-Fi Alliance® NAN Technical Specification may be an infrastructure device.

At block 865, the logic flow may include communicating a response to the cluster discovery message if the device receiving the cluster discovery message is an infrastructure devices in the NAN cluster identified by the cluster discovery message. As previously discussed, the response may include information such as a NAN identification and a timestamp offset to synchronize its clock with the other STAs in the NAN cluster. Further, the response may be used by the STA searching for the NAN cluster to join the NAN cluster.

Figure 9:
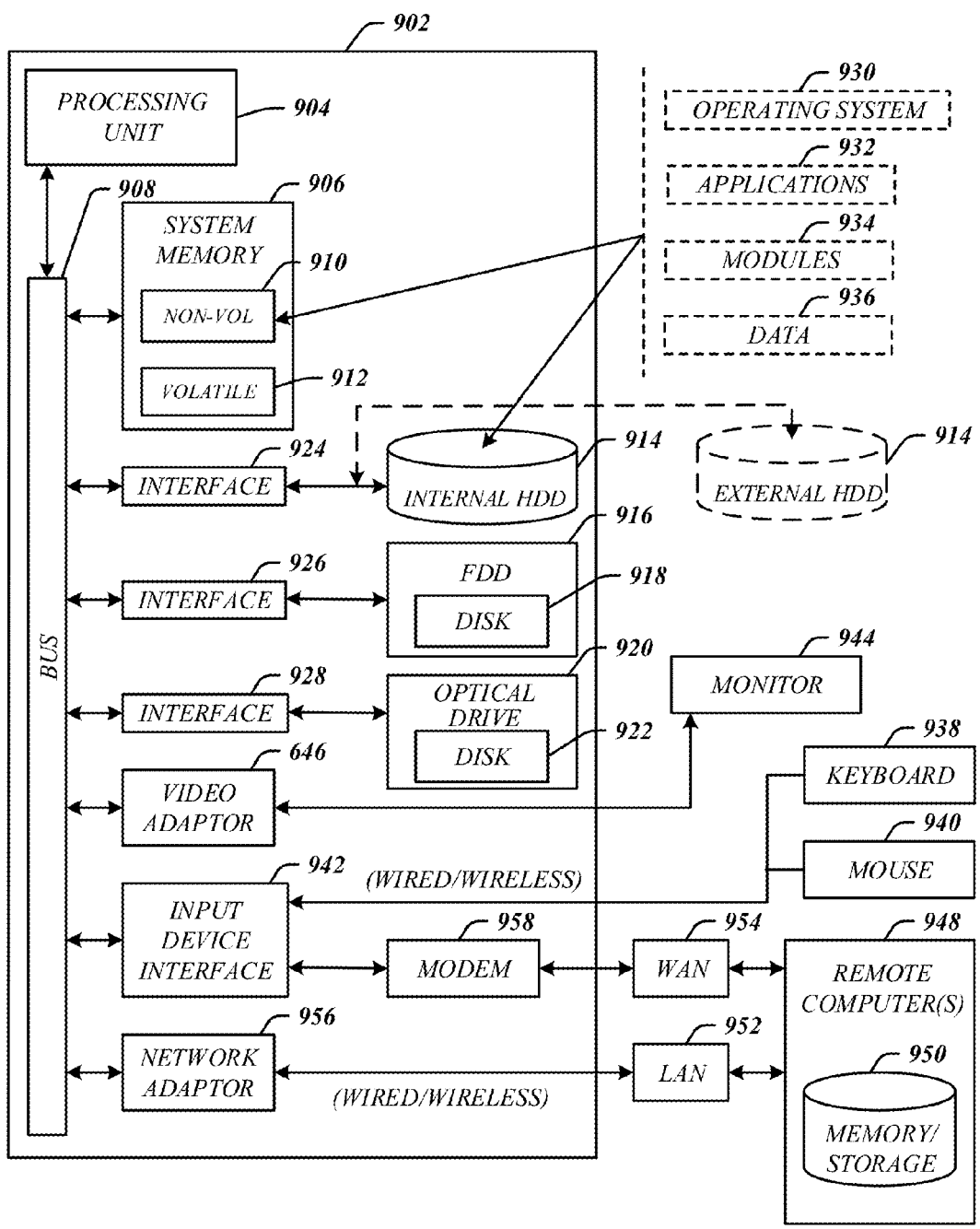
FIG. 9 illustrates an exemplary embodiment of a first computing architecture.

FIG. 9 illustrates an embodiment of an exemplary computing architecture 900 suitable for implementing various embodiments as previously described. In one embodiment, the computing architecture 900 may comprise or be implemented as part of or system 100 and computing device 105.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, such as those described with reference to the processor component 102 shown in FIG. 1.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 105.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements of the computer system 100 as previously described with reference to FIGS. 1-8 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through thirty-three (1-33) provided below are intended to be exemplary and non-limiting.

In a first example, a system or an apparatus may include a memory, processing circuitry, a neighbor awareness network (NAN) discovery module for execution on the processing circuitry to perform NAN discovery operations to discover a NAN cluster comprising one or more devices synchronized to a discovery window, the NAN discovery operations to communicate a cluster discovery message to join the NAN cluster, determine whether a response to the cluster discovery message is received within a first time period, and join the NAN cluster based on information in the response to synchronize to the discovery window when the response is received within the first time period. The system or the apparatus may also include a discovery power module for execution on the processing circuitry to disable one or more operations to perform the NAN discovery operations when the response is not received within the first time period.

In a second example and in furtherance of the first example, a system or apparatus may include the cluster discovery message comprising at least a NAN identification to identify the NAN cluster and the NAN discovery module to receive the response from an infrastructure device in the NAN cluster identified by the NAN identification.

In a third example and in furtherance of any of the previous examples, a system or apparatus may include the response comprising at least one of a synchronization beacon message, a discovery beacon message, and a probe response.

In a fourth example and in furtherance of any of the previous examples, a system or apparatus may include an infrastructure discovery module for execution on the processing circuitry to determine whether the NAN cluster is an infrastructure environment comprising at least one infrastructure device and the discovery power module to disable the one or more operations to perform the NAN discovery operations if the NAN cluster is not an infrastructure environment comprising at least one infrastructure device.

In a fifth example and in furtherance of any of the previous examples, a system or apparatus may include the infrastructure discovery module to perform a scanning procedure to detect one or more infrastructure devices and the discovery power module to disable the one or more operations to perform the NAN discovery operations if at least one infrastructure device does not respond within a second time period during the scanning procedure.

In a sixth example and in furtherance of any of the previous examples, a system or apparatus may include the discovery power module to disable the one or more operations to perform the NAN discovery operations on the apparatus when the apparatus operates as a master for longer than a third time period.

In a seventh example and in furtherance of any of the previous examples, an article may include a computer-readable storage medium containing a plurality of instructions that when executed enable a computing device to perform neighbor awareness network (NAN) discovery operations to discover a NAN cluster comprising one or more devices synchronized to a discovery window, the NAN discovery operations that when executed enable the computing device to communicate a cluster discovery message to join the NAN cluster, determine whether a response to the cluster discovery message is received within a first time period, join the NAN cluster based on information in the response to synchronize to the discovery window when the response is received within the first time period. The article comprising a computer-readable storage medium containing a plurality of instructions that when executed enable a computing device to disable one or more operations to perform the NAN discovery operations when the response is not received within the first time period.

In an eighth example and in furtherance of any of the previous examples, the cluster discovery message may include at least a NAN identification to identify the NAN cluster, and the article comprising instructions that when executed enable the computing device to receive the response from an infrastructure device in the NAN cluster identified by the NAN identification.

In a ninth example and in furtherance of any of the previous examples, the article may include instructions that when executed enable the computing device to process the response including at least one of a synchronization beacon message, a discovery beacon message, and a probe response.

In a tenth example and in furtherance of any of the previous examples, the article may include instructions that when executed enable the computing device to determine whether the NAN cluster is an infrastructure environment comprising at least one infrastructure device and disable the one or more operations to perform the NAN discovery operations if the NAN cluster is not an infrastructure environment comprising at least one infrastructure device.

In an eleventh example and in furtherance of any of the previous examples, the article may include instructions that when executed enable the computing device to perform a scanning procedure to detect one or more infrastructure devices and disable the one or more operations to perform the NAN discovery operations when at least one infrastructure device does not respond within a second time period during the scanning procedure.

In a twelfth example and in furtherance of any of the previous examples, the article may include comprising instructions that when executed enable the computing device to disable the one or more operations to perform the NAN discovery operations on the computing device if the computing device operates as a master for longer than a third time period.

In a thirteenth example and in furtherance of any of the previous examples, a computer-implemented method may include performing, by processing circuitry, neighbor awareness network (NAN) discovery operations to discover a NAN cluster comprising one or more devices synchronized to a discovery window, the NAN discovery operations comprising communicating a cluster discovery message to join the NAN cluster, determining whether a response to the cluster discovery message is received within a first time period and joining the NAN cluster based on information in the response to synchronize to the discovery window when the response is received within the first time period. The computer-implemented method may include disabling, by the processing circuitry, one or more operations to perform the NAN discovery operations when the response is not received within the first time period.

In a fourteenth example and in furtherance of any of the previous examples, a method may include the cluster discovery message comprising at least a NAN identification to identify the NAN cluster and the computer-implemented method may also include receiving the response from an infrastructure device in the NAN cluster identified by the NAN identification.

In a fifteenth example and in furtherance of any of the previous examples, a method may include the response comprising at least one of a synchronization beacon message, a discovery beacon message, and a probe response.

In a sixteenth example and in furtherance of any of the previous examples, a method may include determining whether the NAN cluster is an infrastructure environment comprising at least one infrastructure device, and disabling, by the processing circuitry, the one or more operations to perform the NAN discovery operations if the NAN cluster is not an infrastructure environment comprising at least one infrastructure device.

In a seventeenth example and in furtherance of any of the previous examples, a method may include the determining comprising performing a scanning procedure to detect one or more infrastructure devices, and disabling, by the processing circuitry, the one or more operations to perform the NAN discovery operations when at least one infrastructure device does not respond within a second time period during the scanning procedure.

In an eighteenth example and in furtherance of any of the previous examples, the method may include disabling, by the processing circuitry, the one or more operations to perform the NAN discovery operations on a device when the device operates as a master device for longer than a third time period.

In a nineteenth example and in furtherance of any of the previous examples, an apparatus may include a memory, processing circuitry; and a neighbor awareness network (NAN) discovery module for execution on the processing circuitry to receive a cluster discovery message comprising a neighbor awareness network (NAN) identification to discover a NAN cluster comprising one or more devices synchronized to a discovery window, determine whether a device receiving the cluster discovery message is an infrastructure device in the NAN cluster identified by the NAN identification, and communicate a response to the cluster discovery message if the device receiving the cluster discovery message is an infrastructure devices in the NAN cluster identified by the cluster discovery message.

In a twentieth example and in furtherance of any of the previous examples, an apparatus may include the NAN discovery module to determine whether the response is communicated within a discovery window and cancel a next scheduled synchronization beacon if the response is communicated within the discovery window.

In a twenty-first example and in furtherance of any of the previous examples, an apparatus may include the NAN discovery module to determine whether the response is communicated prior to a scheduled discovery beacon, and communicate the scheduled discovery beacon within a certain amount of time after communicating the response.

In a twenty-second example and in furtherance of any of the previous examples, a computer-implemented method may include receiving, by processing circuitry, a cluster discovery message comprising a neighbor awareness network (NAN) identification to discover a NAN cluster comprising one or more devices synchronized to a discovery window, determining, by the processing circuitry, whether a device receiving the cluster discovery message is an infrastructure device in the NAN cluster identified by the NAN identification and communicating, by the processing circuitry, a response to the cluster discovery message if the device receiving the cluster discovery message is an infrastructure devices in the NAN cluster identified by the cluster discovery message.

In a twenty-third example and in furtherance of any of the previous examples, a computer-implemented method may include determining whether the response is communicated within a discovery window and canceling a next scheduled synchronization beacon if the response is communicated within the discovery window.

In a twenty-fourth example and in furtherance of any of the previous examples, a computer-implemented method may include determining whether the response is communicated prior to a scheduled discovery beacon and communicating the scheduled discovery beacon within a certain amount of time after communicating the response.

In a twenty-fifth example and in furtherance of any of the previous examples, an apparatus may include means for performing neighbor awareness network (NAN) discovery operations to discover a NAN cluster comprising one or more devices synchronized to a discovery window, means for communicating a cluster discovery message to join the NAN cluster, means for determining whether a response to the cluster discovery message is received within a first time period, means for joining the NAN cluster based on information in the response to synchronize to the discovery window when the response is received within the first time period and means for disabling one or more operations to perform the NAN discovery operations when the response is not received within the first time period.

In a twenty-sixth example and in furtherance of any of the previous examples, an apparatus may include the cluster discovery message comprising at least a NAN identification to identify the NAN cluster, and the apparatus comprising means for receiving the response from an infrastructure device in the NAN cluster identified by the NAN identification.

In a twenty-seventh example and in furtherance of any of the previous examples, an apparatus may include the response include at least one of a synchronization beacon message, a discovery beacon message, and a probe response.

In a twenty-eighth example and in furtherance of any of the previous examples, an apparatus may include means for determining whether the NAN cluster is an infrastructure environment comprising at least one infrastructure device and means for disabling the one or more operations to perform the NAN discovery operations if the NAN cluster is not an infrastructure environment comprising at least one infrastructure device.

In a twenty-ninth example and in furtherance of any of the previous examples, an apparatus may include means for performing a scanning procedure to detect one or more infrastructure devices and means for disabling the one or more operations to perform the NAN discovery operations when at least one infrastructure device does not respond within a second time period during the scanning procedure.

In a thirtieth example and in furtherance of any of the previous examples, an apparatus may include means for disabling the one or more operations to perform the NAN discovery operations on the computing device if the computing device operates as a master for longer than a third time period.

In a thirty-first example and in furtherance of any of the previous examples, an apparatus may include means for receiving a cluster discovery message comprising a neighbor awareness network (NAN) identification to discover a NAN cluster comprising one or more devices synchronized to a discovery windows, means for determining whether a device receiving the cluster discovery message is an infrastructure device in the NAN cluster identified by the NAN identification and means for communicating a response to the cluster discovery message if the device receiving the cluster discovery message is an infrastructure devices in the NAN cluster identified by the cluster discovery message.

In a thirty-second example and in furtherance of any of the previous examples, an apparatus may include means for determining whether the response is communicated within a discovery window and means for canceling a next scheduled synchronization beacon if the response is communicated within the discovery window.

In a thirty-third example and in furtherance of any of the previous examples, an apparatus may include means for determining whether the response is communicated prior to a scheduled discovery beacon and means for communicating the scheduled discovery beacon within a certain amount of time after communicating the response.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected"

along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
   a memory;
   processing circuitry;
   a neighbor awareness network (NAN) discovery module for execution on the processing circuitry to perform NAN discovery operations to discover a NAN cluster comprising one or more devices synchronized to a discovery window, the NAN discovery operations to:
   communicate a cluster discovery message to join the NAN cluster;
   determine whether a response to the cluster discovery message is received within a first time period; and
   join the NAN cluster based on information in the response to synchronize to the discovery window when the response is received within the first time period; and
   a discovery power module for execution on the processing circuitry to disable one or more operations to perform the NAN discovery operations when the response is not received within the first time period.

2. The apparatus of claim 1, the cluster discovery message comprising at least a NAN identification to identify the NAN cluster; and
   the NAN discovery module to receive the response from an infrastructure device in the NAN cluster identified by the NAN identification.

3. The apparatus of claim 1, the response comprising at least one of a synchronization beacon message, a discovery beacon message, and a probe response.

4. The apparatus of claim 1, comprising:
   an infrastructure discovery module for execution on the processing circuitry to determine whether the NAN cluster is an infrastructure environment comprising at least one infrastructure device; and
   the discovery power module to disable the one or more operations to perform the NAN discovery operations if the NAN cluster is not an infrastructure environment comprising at least one infrastructure device.

5. The apparatus of claim 4, the infrastructure discovery module to perform a scanning procedure to detect one or more infrastructure devices; and
   the discovery power module to disable the one or more operations to perform the NAN discovery operations if at least one infrastructure device does not respond within a second time period during the scanning procedure.

6. The apparatus of claim 1, comprising:
   the discovery power module to disable the one or more operations to perform the NAN discovery operations on the apparatus when the apparatus operates as a master for longer than a third time period.

7. The apparatus of claim 1, comprising:
   one or more input/output (I/O);
   a transceiver; and
   an antenna coupled with the transceiver.

8. An article comprising a computer-readable storage medium containing a plurality of instructions that when executed enable a computing device to:
   perform neighbor awareness network (NAN) discovery operations to discover a NAN cluster comprising one or more devices synchronized to a discovery window, the NAN discovery operations that when executed enable the computing device to:
   communicate a cluster discovery message to join the NAN cluster;
   determine whether a response to the cluster discovery message is received within a first time period; and
   join the NAN cluster based on information in the response to synchronize to the discovery window when the response is received within the first time period; and
   disable one or more operations to perform the NAN discovery operations when the response is not received within the first time period.

9. The article of claim 8, the cluster discovery message comprising at least a NAN identification to identify the NAN cluster, and the article comprising instructions that when executed enable the computing device to receive the response from an infrastructure device in the NAN cluster identified by the NAN identification.

10. The article of claim 8, the response comprising at least one of a synchronization beacon message, a discovery beacon message, and a probe response.

11. The article of claim 8, comprising instructions that when executed enable the computing device to:
    determine whether the NAN cluster is an infrastructure environment comprising at least one infrastructure device; and
    disable the one or more operations to perform the NAN discovery operations if the NAN cluster is not an infrastructure environment comprising at least one infrastructure device.

12. The article of claim 11, comprising instructions that when executed enable the computing device to:
    perform a scanning procedure to detect one or more infrastructure devices; and disable the one or more operations to perform the NAN discovery operations when at least one infrastructure device does not respond within a second time period during the scanning procedure.

13. The article of claim 8, comprising instructions that when executed enable the computing device to disable the one or more operations to perform the NAN discovery operations on the computing device if the computing device operates as a master for longer than a third time period.

14. A computer-implemented method comprising:
performing, by processing circuitry, neighbor awareness network (NAN) discovery operations to discover a NAN cluster comprising one or more devices synchronized to a discovery window, the NAN discovery operations comprising:
communicating a cluster discovery message to join the NAN cluster;
determining whether a response to the cluster discovery message is received within a first time period; and
joining the NAN cluster based on information in the response to synchronize to the discovery window when the response is received within the first time period; and
the computer-implemented method comprising disabling, by the processing circuitry, one or more operations to perform the NAN discovery operations when the response is not received within the first time period.

15. The computer-implemented method of claim 14, the cluster discovery message comprising at least a NAN identification to identify the NAN cluster; and
the computer-implemented method comprising receiving the response from an infrastructure device in the NAN cluster identified by the NAN identification.

16. The computer-implemented method of claim 14, the response comprising at least one of a synchronization beacon message, a discovery beacon message, and a probe response.

17. The computer-implemented method of claim 14, comprising:
determining whether the NAN cluster is an infrastructure environment comprising at least one infrastructure device; and
disabling, by the processing circuitry, the one or more operations to perform the NAN discovery operations if the NAN cluster is not an infrastructure environment comprising at least one infrastructure device.

18. The computer-implemented method of claim 17, the determining comprising performing a scanning procedure to detect one or more infrastructure devices; and
disabling, by the processing circuitry, the one or more operations to perform the NAN discovery operations when at least one infrastructure device does not respond within a second time period during the scanning procedure.

19. The computer-implemented method of claim 14, comprising:
disabling, by the processing circuitry, the one or more operations to perform the NAN discovery operations on a device when the device operates as a master device for longer than a third time period.

20. An apparatus comprising:
a memory;
processing circuitry; and
a neighbor awareness network (NAN) discovery module for execution on the processing circuitry to:
receive a cluster discovery message comprising a neighbor awareness network (NAN) identification to discover a NAN cluster comprising one or more devices synchronized to a discovery window,
determine whether a device receiving the cluster discovery message is an infrastructure device in the NAN cluster identified by the NAN identification, and
communicate a response to the cluster discovery message if the device receiving the cluster discovery message is an infrastructure devices in the NAN cluster identified by the cluster discovery message.

21. The apparatus of claim 20, the NAN discovery module to determine whether the response is communicated within a discovery window and cancel a next scheduled synchronization beacon if the response is communicated within the discovery window.

22. The apparatus of claim 20, the NAN discovery module to determine whether the response is communicated prior to a scheduled discovery beacon, and communicate the scheduled discovery beacon within a certain amount of time after communicating the response.

23. The apparatus of claim 20, comprising:
at least one input/output (I/O) device;
a transceiver; and
an antenna coupled with the transceiver.

24. A computer-implemented method, comprising:
receiving, by processing circuitry, a cluster discovery message comprising a neighbor awareness network (NAN) identification to discover a NAN cluster comprising one or more devices synchronized to a discovery window;
determining, by the processing circuitry, whether a device receiving the cluster discovery message is an infrastructure device in the NAN cluster identified by the NAN identification; and
communicating, by the processing circuitry, a response to the cluster discovery message if the device receiving the cluster discovery message is an infrastructure devices in the NAN cluster identified by the cluster discovery message.

25. The computer-implemented method of claim 24, comprising:
determining whether the response is communicated within a discovery window; and
canceling a next scheduled synchronization beacon if the response is communicated within the discovery window.

26. The computer-implemented method of claim 24, comprising:
determining whether the response is communicated prior to a scheduled discovery beacon; and
communicating the scheduled discovery beacon within a certain amount of time after communicating the response.

* * * * *